(12) United States Patent
Fournie

(10) Patent No.: US 7,444,595 B2
(45) Date of Patent: Oct. 28, 2008

(54) GRAPHICAL PROGRAMMING SYSTEM AND METHOD FOR CREATING AND MANAGING A SCENE GRAPH

(75) Inventor: Jonathan P. Fournie, Austin, TX (US)

(73) Assignee: National Instruments Corporation, Austin, TX (US)

( * ) Notice: Subject to any disclaimer, the term of this patent is extended or adjusted under 35 U.S.C. 154(b) by 817 days.

(21) Appl. No.: 10/770,709

(22) Filed: Feb. 3, 2004

(65) Prior Publication Data

US 2005/0039176 A1 Feb. 17, 2005

Related U.S. Application Data

(60) Provisional application No. 60/494,732, filed on Aug. 13, 2003.

(51) Int. Cl.
*G06F 9/00* (2006.01)
(52) U.S. Cl. .................................. 715/763; 715/771
(58) Field of Classification Search ................ 715/734, 715/735, 736, 737, 848, 849, 850, 771–773, 715/763, 762, 730, 731, 732; 717/135, 113, 717/11, 1, 2, 8; 707/500.1
See application file for complete search history.

(56) References Cited

U.S. PATENT DOCUMENTS

| | | | |
|---|---|---|---|
| 5,504,917 A | 4/1996 | Austin | |
| 6,243,856 B1 * | 6/2001 | Meyer et al. | 717/146 |
| 6,262,734 B1 * | 7/2001 | Ishikawa | 715/850 |
| 6,263,496 B1 * | 7/2001 | Meyer et al. | 717/114 |
| 6,282,455 B1 * | 8/2001 | Engdahl | 700/83 |
| 6,493,001 B1 * | 12/2002 | Takagi et al. | 715/759 |
| 6,570,564 B1 | 5/2003 | Sowizral et al. | |
| 6,577,958 B1 * | 6/2003 | Green et al. | 702/45 |
| 7,024,660 B2 * | 4/2006 | Andrade et al. | 717/124 |
| 2002/0032697 A1 * | 3/2002 | French et al. | 707/500.1 |
| 2003/0079207 A1 * | 4/2003 | Xavier et al. | 717/135 |
| 2004/0139157 A1 * | 7/2004 | Neely et al. | 709/205 |
| 2004/0189669 A1 * | 9/2004 | David et al. | 345/619 |
| 2005/0066280 A1 * | 3/2005 | Austin et al. | 715/733 |
| 2006/0015862 A1 * | 1/2006 | Odom et al. | 717/168 |

* cited by examiner

*Primary Examiner*—Steven P Sax
(74) *Attorney, Agent, or Firm*—Meyertons Hood Kivlin Kowert & Goetzel, P.C.; Jeffrey C. Hood; Mark S. Williams

(57) ABSTRACT

System and method for creating a scene graph. A data flow diagram is created in response to input, including displaying a first plurality of nodes on a display which are executable to create at least a portion of the scene graph, and connecting the nodes to create the data flow diagram, where the nodes are connected to specify data flow among the plurality of nodes. The data flow diagram is executed to create the scene graph. The scene graph specifies a plurality of objects and relationships between the objects, e.g., via an object hierarchy, and is usable in rendering a graphical image of the plurality of objects, e.g., a 3D scene. The scene graph is stored in a memory medium. At least one render node may be included in the data flow diagram which receives the scene graph as an input and renders the image based on the scene graph.

28 Claims, 16 Drawing Sheets

GRAPHICAL PROGRAMMING SYSTEM AND METHOD FOR CREATING AND MANAGING A SCENE GRAPH

PRIORITY DATA

This application claims benefit of priority of U.S. provisional application Ser. No. 60/494,732 titled "Graphical Programming System and Method for Creating and Managing A Scene Graph" filed Aug. 13, 2003, whose inventor was Jonathan P. Fournie.

FIELD OF THE INVENTION

The present invention relates to the field of graphical programming, and more particularly to a system and method for creating a scene graph, e.g., for a three dimensional scene.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Thus, graphical programming systems such as LabVIEW generally help users see what their program is doing and how their data appear or behave. For example, LabVIEW provides a number of pre-built indicators such as LEDs, tanks, meters, etc. that allow users to see the value of data points or parameters of interest. Various charts and graphs are also provided to enable users to plot large amounts of data to determine trends, intersections between data sets, and other useful features of the data. Additionally, as disclosed in U.S. Pat. No. 5,504,917 titled "Method and Apparatus for Providing Picture Generation and Control Features in a Graphical Data Flow Environment", LabVIEW includes two dimensional (2D) picture control functionality which enables the user to draw a variety of generic two dimensional objects, such as circles, lines, rectangles, etc. However, there is still a large space of visualization problems for which current graphical programming development environments offer no solution, notably, three dimensional (3D) scene creation and rendering.

One problem with providing 3D image or picture generation features in a graphical data flow environment such as that described in Kodosky et al is how to incorporate these features while still maintaining the data flow structure of the environment. The data flow programming model in Kodosky et al is based on nodes that receive data as input, process this data, and then produce output data that are then provided to other nodes. In order to maintain a proper data flow relationship, it is important that nodes not have any side effects, i.e., that they do not change the state of the system in ways not obvious from the data that is produced by the node. It is also important in a data flow environment that nodes be able to generate data that can in turn be passed on to other nodes.

Functional drawing commands typically provided in non-data flow drawing applications may cause problems in a data flow environment. For example, if a node received two 3D points and then immediately drew a line on the screen between these two points, as would occur using a functional library, no data would have been generated by the node representing that the line had been drawn other than the image that appeared on the screen. In addition, the line drawn on the screen would be a change in the state of the system that would not be reflected by any output from the node. This would be contrary to the data flow model provided in Kodosky et al. Therefore, a method and apparatus is desired which provides 3D picture generation and control features in a data flow environment which allow the user to build graphical pictures to represent 3D data, as desired, although it should be noted that in rendering 3D scenes, it is typical to generate a scene graph to create the entire scene before attempting to render any of the parts, however, the same (data flow) model should preferably be adhered to. Examples of 3D data include vehicle suspension reactions, robot arm position, and space shuttle surface temperature, among others.

Applicant is aware of various drawing applications that allow a user to create pictures (including "3D" pictures) on a computer screen. Certain drawing applications receive drawing selections from a user and save these selections as a series of drawing instructions. One problem with many prior art drawing applications is that it is difficult to change a picture after the picture has been completed. For example, if a user creates a picture with a number of shapes, and the user later decides to change certain parameters about each of the shapes, the user is many times required to manually change each shape to affect the desired change in the drawing. Some programs allow the user to change various parameters relating to a picture using a graphical icon, for example, allowing the user to change the color of a picture using a color palette. There are other applications of scene graphs as well, such as, for example, using the scene graph for a 3D scene of objects to compute and otherwise manage simulation events, e.g., collisions, motion, and so forth, between the objects.

It would be highly desirable to implement a drawing application as a computer program, and more particularly as a data flow program, to allow a user to more logically and easily construct 3D images (actually, these are generally 2D rendered images of 3D scenes). In addition, it would be desirable to allow a user to create modular programs which create certain scene graphs or 3D pictures to enable these programs to be used as subroutines in other programs. This would enable the user to more easily construct diagrams using modular subroutines that previously have been created to display certain 3D drawings, e.g., subroutines could be created that would attach entire sub-branches of an object hierarchy to a specified section of a scene graph. It would be highly desirable for a 3D drawing application to include a feature whereby the user could merely change certain parameters using controls on a front panel to affect various desired changes in a 3D model, simulation, drawing, scene graph, etc. It would also be desirable to allow a user to programmatically design the type and number of controls desired for a respective 3D model, simulation, drawing, scene graph, etc.

SUMMARY OF THE INVENTION

One embodiment of the present invention comprises a graphical programming system and method for creating and managing a scene graph, e.g., for a three dimensional (3D) scene. As used herein, the term "scene graph" refers to information (e.g., a data structure) that specifies a plurality of objects and their relationships with one another, where the scene graph is usable in rendering a graphical image of the scene. In a preferred embodiment, the scene is a three dimensional scene, e.g., a scene with one or more 3D objects in a 3D spatial configuration, although it should be noted that scenes and objects of other dimensionality are also contemplated.

In one embodiment, a first plurality of nodes may be displayed on a display (e.g., in a GUI on a computer monitor), where each of the plurality of nodes is executable to create at least a portion of a scene graph. For example, the first plurality of nodes may be displayed in a block diagram window, as used in the LabVIEW graphical development environment.

Then, the first plurality of nodes may be connected to create the data flow diagram, where the first plurality of nodes are connected to specify data flow among the plurality of nodes. Thus, a data flow diagram may be created in response to input, where the input may be user input, or programmatic input from a program or from an external system coupled to a host computer.

Thus, the data flow diagram, which in some embodiments may also be referred to as a graphical program, may be created or assembled by the user arranging on the display the plurality of nodes or icons and then interconnecting the nodes to create the data flow diagram. For example, in one embodiment, a second plurality of nodes may be displayed on the display, where each of the second plurality of nodes is selectable for inclusion in a data flow diagram, and user input received selecting the first plurality of nodes from the second plurality of nodes. In a preferred embodiment, the second plurality of nodes may be displayed in one or more palettes. In response to the user assembling the data flow diagram, data structures may be created and stored which represent the data flow diagram. The data flow diagram may thus comprise a plurality of interconnected nodes or icons which visually indicates the functionality of the diagram or graphical program.

In embodiments where the data flow diagram comprises a graphical program, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the data flow diagram or graphical program may be created by the user creating or specifying a prototype, followed by automatic or programmatic creation of the data flow diagram or graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein.

The data flow diagram (or graphical program) may then be executed to create the scene graph, where, as noted above, the scene graph specifies a plurality of objects and relationships between the objects, and is usable in rendering a graphical image of the plurality of objects. In other words, in executing the data flow diagram, the plurality of nodes (selected by the input above) may execute to programmatically generate the scene graph.

In one embodiment, the method may also include storing the scene graph after said executing. In other words, once the scene graph has been generated, the generated scene graph may be stored in a memory medium, for example, a memory medium of the host computer or an external system coupled to the host computer. Said another way, the generated scene graph may be comprised in a data structure, e.g., a file or other data structure, and stored for later use.

As noted above, in some embodiments the data flow diagram comprises a graphical program, including a block diagram portion and a user interface portion. In one embodiment, during execution of the graphical program, the graphical user interface may be displayed on a display of a first computer system and the block diagram may execute on a second computer system.

In one embodiment, displaying the plurality of nodes may further include displaying at least one render node (or functional equivalent) that is operable to receive the scene graph as an input and render an image based on the scene graph. Thus, the data flow diagram (or graphical program) may include the (at least one) render node where the render node is connected (e.g., via a wire in the data flow diagram) to those nodes of the plurality of nodes that execute to generate the scene graph. The execution of the data flow diagram may thus include executing those nodes to generate the scene graph, and providing the generated scene graph as input to the (at least one) render node, which may execute to render (i.e., draw) the specified scene based on or in accordance with the scene graph.

In one embodiment, the data flow diagram may be created, but may not be executed. For example, the data flow diagram may be created and stored for later use, e.g., for transmission to another user as an example, as a prototype for another user to build on, etc.

As mentioned above, in a preferred embodiment, the scene for which the scene graph is generated is a 3D scene, including a plurality of 3D objects in a specified spatial arrangement. In a preferred embodiment, the scene graph includes an object hierarchy, where the object hierarchy specifies relationships between objects in the scene. The object hierarchy preferably includes nodes corresponding respectively to the objects in the scene, and so each node in the object hierarchy may contain information related to the corresponding object, such as, for example, a name, a parent (which is another object/node), one or more children (e.g., child objects or nodes) and/or a transformation, where, as is well known in the art, the transformation may specify a translation, rotation, and/or scaling, that transforms the object's geometry from local coordinates to world coordinates. The scene graph also preferably includes a plurality of models and/or a plurality of skins, e.g., in the form of a model list and/or a skin list, which in one embodiment, may be included in the object hierarchy. For example, in one embodiment, each node in the object hierarchy may optionally contain a model and a skin, where a model is the geometric information necessary to draw a 3D geometry (the 3D object), and a skin is the surface description for a model such as the model's color, shininess, texture map, etc.

In one embodiment, model nodes may be provided for managing object models in the scene. For example, in one embodiment, an add model node may be provided to add a new model (corresponding to an object type) for use in the scene, a delete model node may be provided to remove a model from use in the scene, and an empty models node may be provided for removing all models from use in the scene. It should be noted that in other embodiments, the nodes may be selected from a menu or other user interface element rather than a palette. For example, the user may invoke a menu of node function options, whereby the user may select nodes based on names or descriptions of their functionalities as opposed to the node icons presented in the palette.

In one embodiment, primitive nodes may be provided that may be used to generate various model data that can be used with the add model node from above. It is noted that this functionality is not necessarily required for the present invention to operate, but may be used to provide the models with geometric object data. For example, the palette may include a build box node which may operate to create a box, a build cone node which may operate to create a cone, a build cylinder node which may operate to create a cylinder, a build sphere node which may operate to create a sphere, and a build toroid node which may operate to create a torus, among others. Additionally, in one embodiment, a build height map node may also be provided that may operate to create a height map, interpreting a two dimensional array of numbers as an evenly distributed field of heights which may be useful for representing arbitrary surfaces such as terrain and so forth. Of course, any other types of geometric primitives may be used as desired, those described above being exemplary only. It should be noted that geometric primitives may be combined to form more complex geometric forms, as is well known in the art.

In one embodiment, nodes for managing skins for the models mentioned above may be provided. As is well known to those skilled in the art, a skin, e.g., a color, texture map, or other surface property, may be assigned to or associated with a model to provide or implement a specified appearance of the corresponding object. For example, an add color node may be provided that operates to create a skin with just a simple color that is unaffected by lighting. An add color array node may be provided that operates to create an array of colors for a model, where, for example, each color in the array may map to a respective single vertex in the model. An add material node may be provided that operates to create a skin that contains diffuse, specular, ambient, and/or emissive color components, where these colors may preferably be affected by the lights in the scene. In one embodiment, this node may also specify a shininess of the object's skin. A delete skin node and an empty skins node may be provided that operates to remove a skin from a global skin list (or its equivalent) and to remove all skins from the global skin list, respectively. Additional skin nodes, such as, for example, an add texture node, are also contemplated.

In one embodiment, nodes may be provided for managing objects that use or include the properties described above, e.g., models, skins, etc. As noted above, the objects are those entities that populate the scene. As one example, an add object node may be provided that may operate to add an object to the scene, i.e., by adding an object to a hierarchy of objects. For example, the user may provide as input the hierarchy to which the object is to be added. In one embodiment, if the object is not coupled to other nodes, a new hierarchy may be created. The user may also provide the new object's name, an ID for the new object's parent, where in one embodiment, if the node is uncoupled to other nodes it may be at the root level of the scene, an ID for model and skin for the object, where in one embodiment, if the node is uncoupled to other nodes it may not display (in one embodiment, an un-displayed object may be used as an extra transformation), and a transformation for positioning and orienting the object. The add object node may return the newly modified (or created) object hierarchy and the ID of the new object that was created. Other object related nodes (not shown), such as a delete object node, empty object nodes, etc., are also contemplated.

Thus, the data flow diagram (or graphical program) may include a variety of nodes that execute to create the scene graph.

In one embodiment, one or more render nodes may be provided for rendering the scene based on the scene graph. For example, in a preferred embodiment, two additional nodes, a render objects node and a render scene node, may also be provided, e.g., in an object nodes palette. These two nodes are not specifically related to the creation of the scene graph, but rather to the rendering of the scene based on the scene graph, described in more detail below.

In one embodiment, nodes for camera management may be provided. Similar to the render nodes mentioned above, these camera-related nodes are typically related to the rendering of the scene, and not the creation of the scene graph. For example, a create camera node may be provided that operates to create a camera for a scene, allowing the user to specify view attributes such as, for example, the type of projection (perspective or orthographic), the field of view (FOV), the near and far clipping planes, and aspect ratio for the image. The specified camera may then be provided as input to one or more render nodes, e.g., the render objects node, for rendering the scene. A create control node may be provided that operates to create a camera controller for a picture control (GUI element for displaying a picture). A camera controller may be used to make the picture control respond to events, e.g., mouse and/or keyboard events, for adjusting the camera position, for example, allowing the user to drag a cursor or equivalent around in the picture control to move or rotate the view on the scene. Thus, in addition to nodes for generating or creating the scene graph for a scene, nodes may also be provided for rendering the scene in accordance with the scene graph.

Thus, in summary, a scene may comprise various 3D objects or models, lights and a camera. The user may programmatically control the position, rotation, scale, material properties, geometry and perhaps other properties of the objects or models. The user may position and set properties such as color and intensity for the lights. The camera may be positioned and its field of view controlled. This functionality may allow users to compose scenes of these objects and then programmatically modify the scene as desired. For example, the user may drag and drop nodes implementing this functionality onto a block diagram and connect them to create a graphical program or data flow diagram to configure and parameterize the scene.

Thus, various embodiments of the systems and methods described herein may be used to specify and create a scene graph, e.g., a scene graph for a 3D scene, using graphical programming techniques.

BRIEF DESCRIPTION OF THE DRAWINGS

A better understanding of the present invention can be obtained when the following detailed description of the preferred embodiment is considered in conjunction with the following drawings, in which.

Figure 1A:
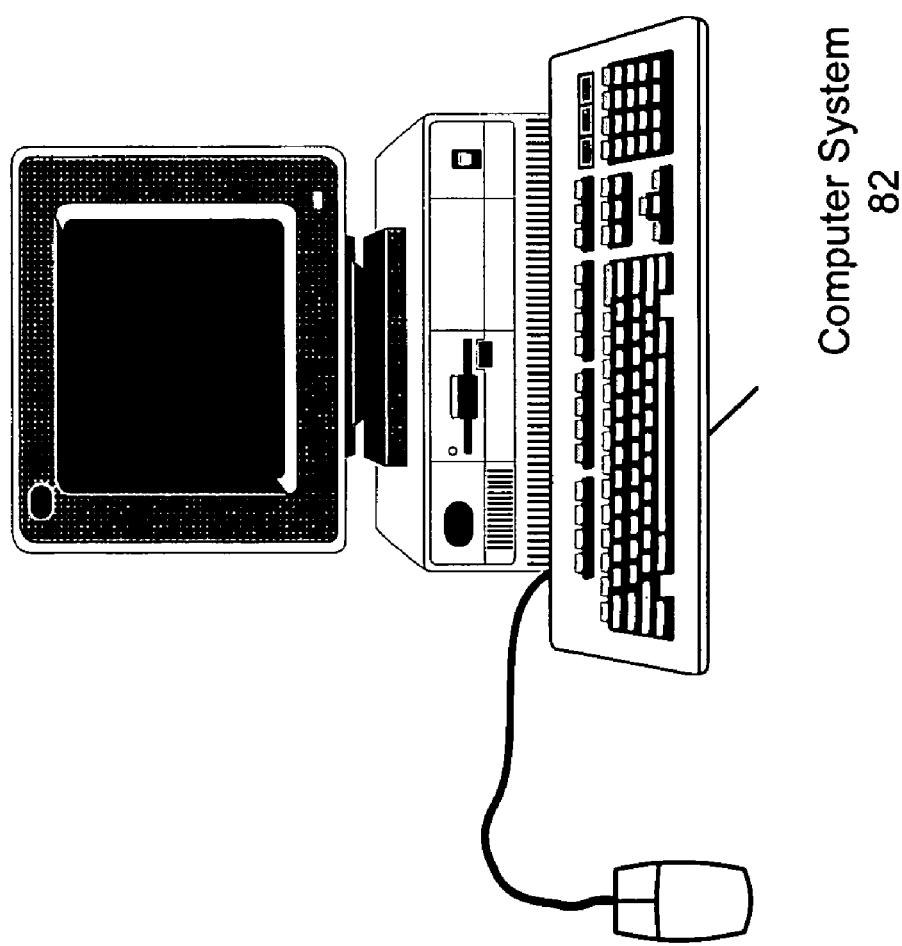
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Application Ser. No. 60/494,732 titled "Graphical Programming System and Method for Creating and Managing A Scene Graph" filed Aug. 13, 2003.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 5,504,917 titled "Method and Apparatus for Providing Picture Generation and Control Features in a Graphical Data Flow Environment", filed Jan. 14, 1994.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—a graphical user interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Transformation—A transformation (or transform) specifies or affects the position, orientation and size of entities in a scene. A transformation is composed of three components: a translation, a rotation and a scale.

The translation is a vector (x, y, z) that results in a positional change in the entity it is associated with. A translation of (1, 2, 3) would move the object 1 unit in the X direction, 2 units in the Y direction and 3 units in the Z direction.

The rotation is a quaternion (w, x, y, z) that results in a change of orientation for the entity it is associated with.

The scale is a single floating-point number that results in a uniform scale of the entity (currently only models) it is associated with.

The components of the transform are applied in this order: scale, rotation, then translation. The result is that the object always scales and rotates around its own local origin (0,0,0) and then translates the amount specified.

Quaternion—A quaternion is a way to represent a rotation. A quaternion is also a very flexible and efficient way to store and accumulate rotations.

Model—the geometric definition for an entity that can be rendered, containing an array of vertices (x, y, z), an array of normal vectors (x, y, z) and an array of faces (v1, v2, v3). The numbers in the face array are indices into the vertex and normal arrays. Thus, a triangles with three points vertex[v1], vertex[v2] and vertex[v3] has normal vectors at these vertices: normal[v1], normal[v2] and normal[v3]. This is a very common format for storing geometric information. It reduces memory size by allowing efficient sharing of vertices. A model can be positioned, oriented and sized by a transformation.

Skin—the surface material properties applied to a model, e.g., a color, material, color array, a texture, etc. A color is just a single RGBA color applied to every vertex in the model. It is not affected by lighting. A material is composed of several components: diffuse color, specular color, ambient color, emissive color and shininess. A color array is similar to a color except that a color is specified for each vertex in the model. OpenGL allows for blending between these colors. A texture is a bitmap that can be mapped onto the surface of the model.

Light—a light in the scene. One can specify the light's diffuse, specular and ambient color. A light can be positioned by a transformation.

Camera—defines the viewing volume that will be rendered. It determines things such as your FOV and near and far clipping planes. It will result in either a perspective or orthographic rendering of the scene into the picture control. A camera can be positioned and oriented by a transformation.

Object—the main component of a 3d scene is a list of objects. The object list contains almost all of the information necessary to define the scene. Each object contains: a name, an index into the model list, a parent (index into the object list), an index into the skin list and a transform. The name may be used for identifying the object. The model tells the object what geometry to draw (−1 indicates no geometry should be drawn). The skin tells the object how to draw the geometry. The transform tells the object where to draw the geometry.

Parent/Child Object—a child object inherits transformation information from its parent. The parent (as a child) could also inherit from its own parent. This allows creation of complex hierarchies of objects which are automatically linked together, e.g., such as a robot arm, such that, for example, when the elbow (parent object) of the robot arm bends, the lower arm, hand and fingers (child objects) all automatically inherit this transformation and move appropriately.

Scene Graph—a set of 3D objects and their relationships to one another, e.g., parent/child, spatial, etc. A scene graph may be used to graphically render a 3D scene.

FIG. 1A—Computer System

FIG. 1A illustrates a computer system 82 suitable for implementing various embodiments of the present invention, i.e., a system and method for 3D picture creation and control using a graphical programming system, e.g., LabVIEW, where a graphical program is created that executes to generate and render a 3D scene.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
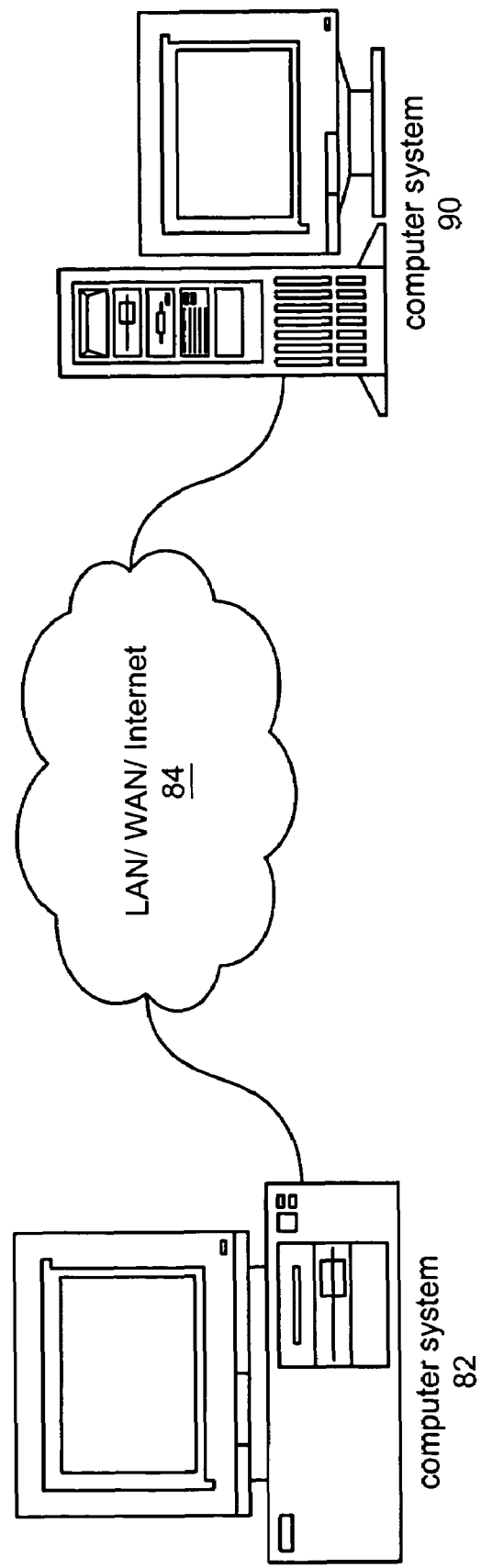
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
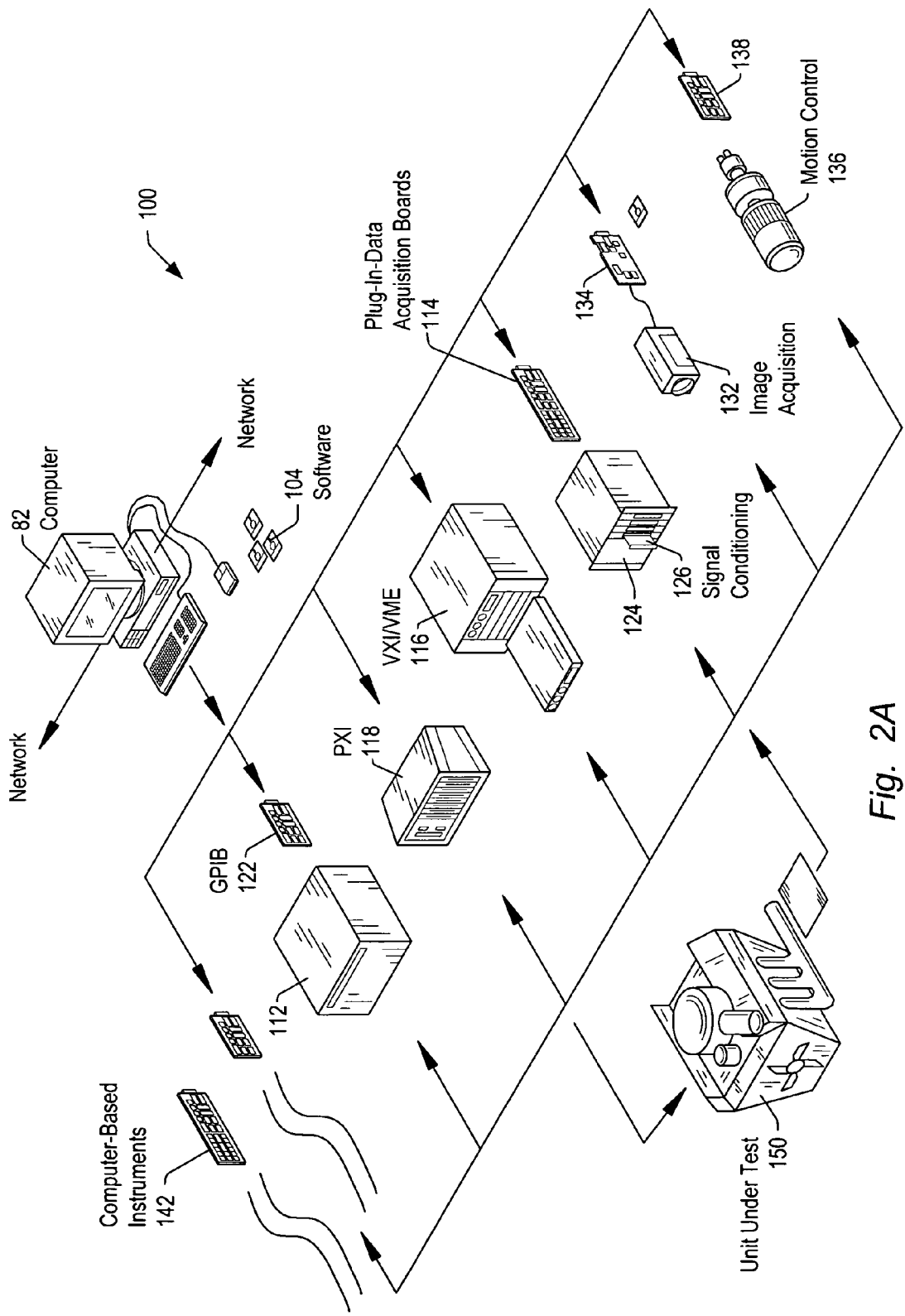
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
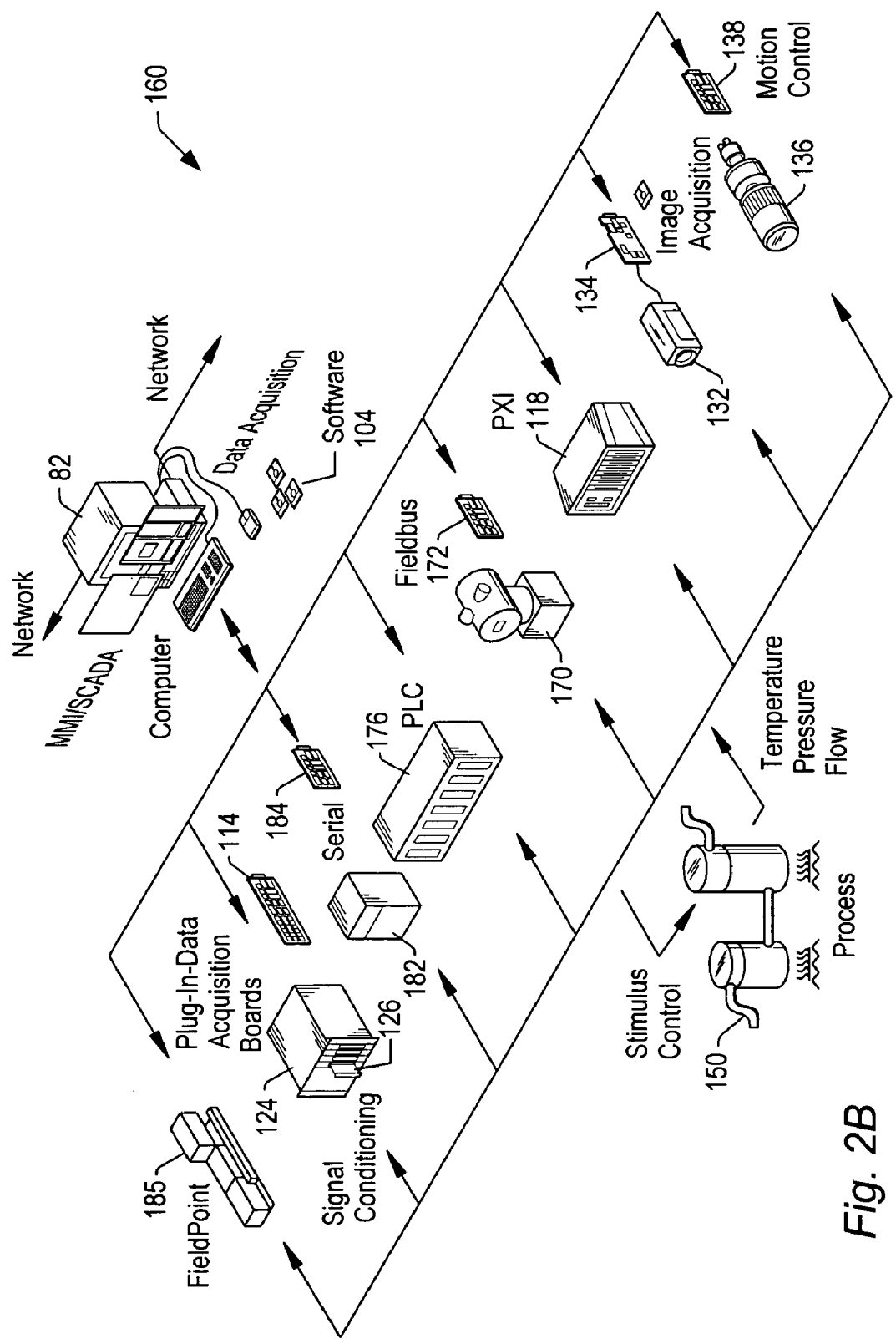
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
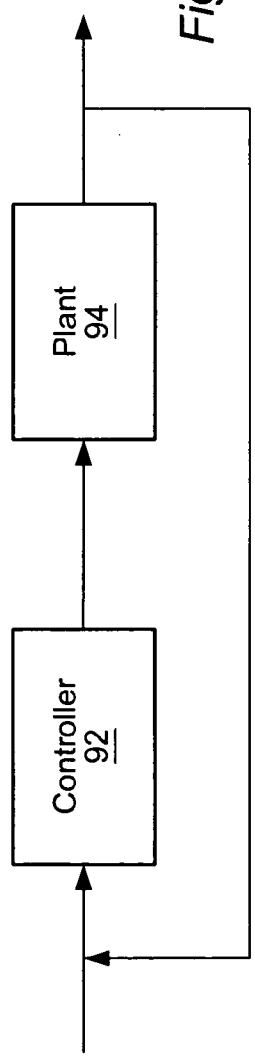
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
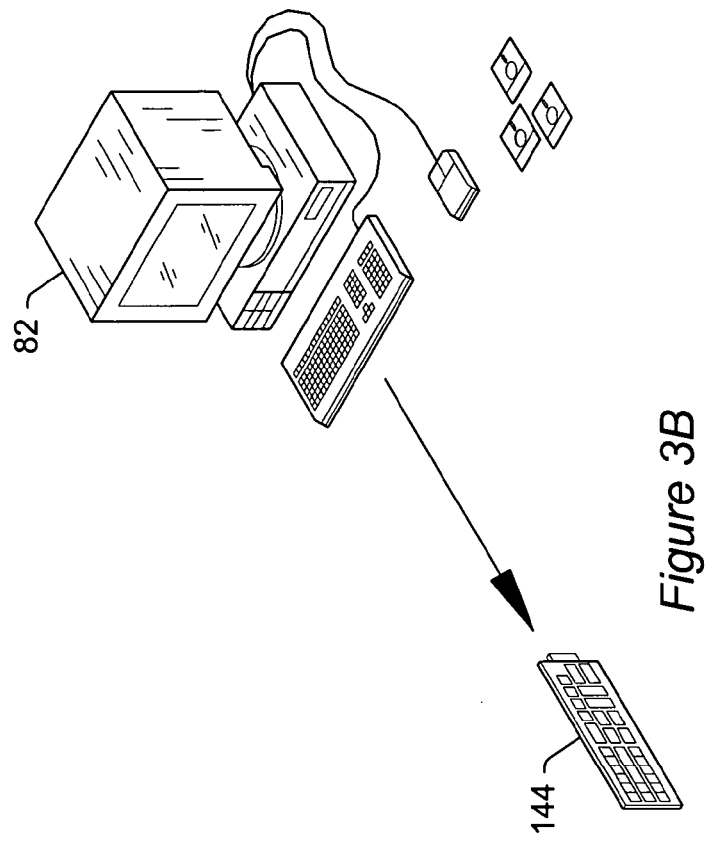
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments (VIs). In some embodiments, a virtual instrument may also include associated hardware, e.g., a computer card or board that provides at least a portion of the VI's functionality and that operates in conjunction with the graphical software program.

Figure 4:
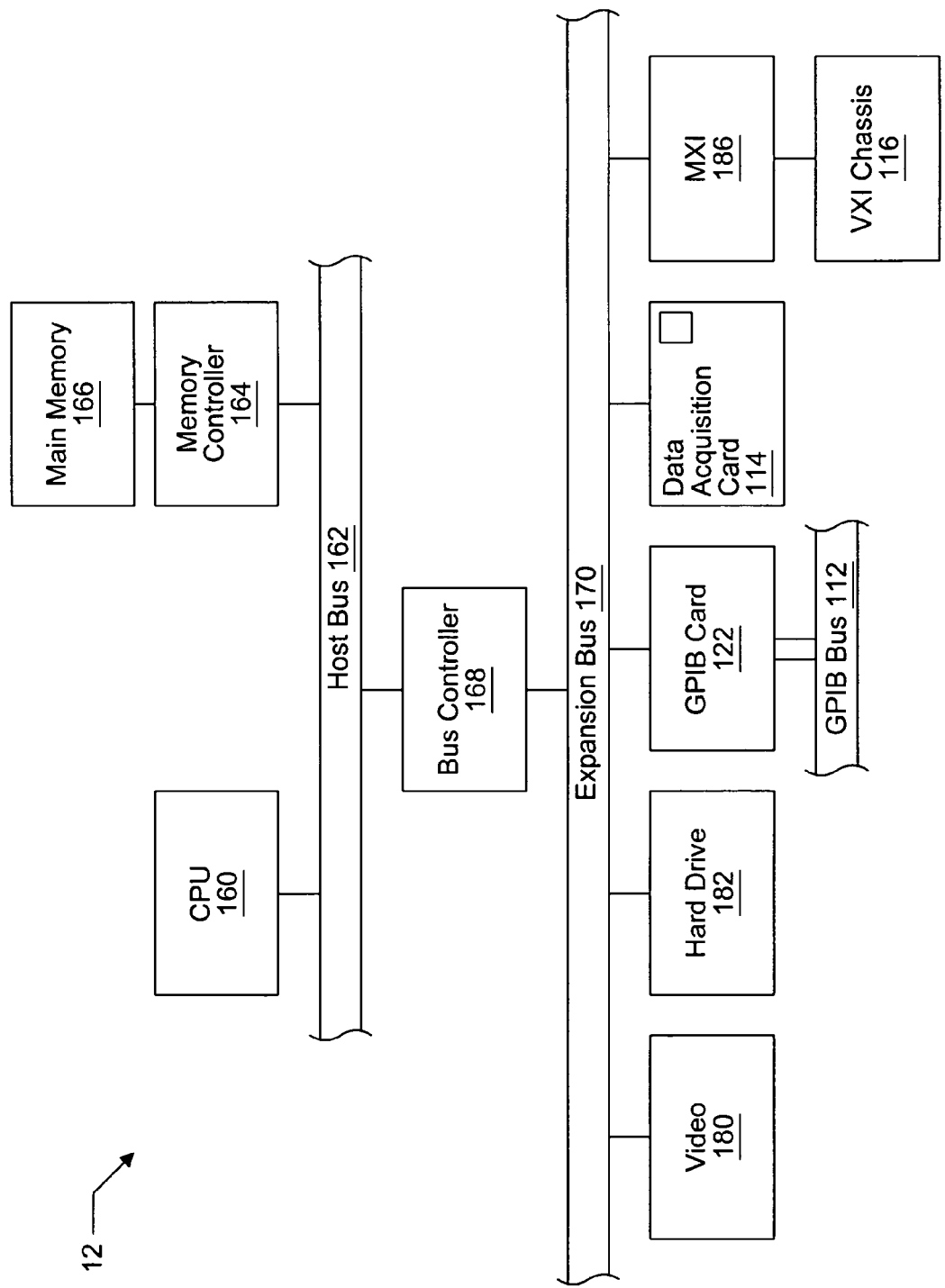
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program development environment (e.g., LabVIEW), and the graphical program operable to create and use a scene graph for a 3D scene. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIG. 5—Flowchart

Figure 5:
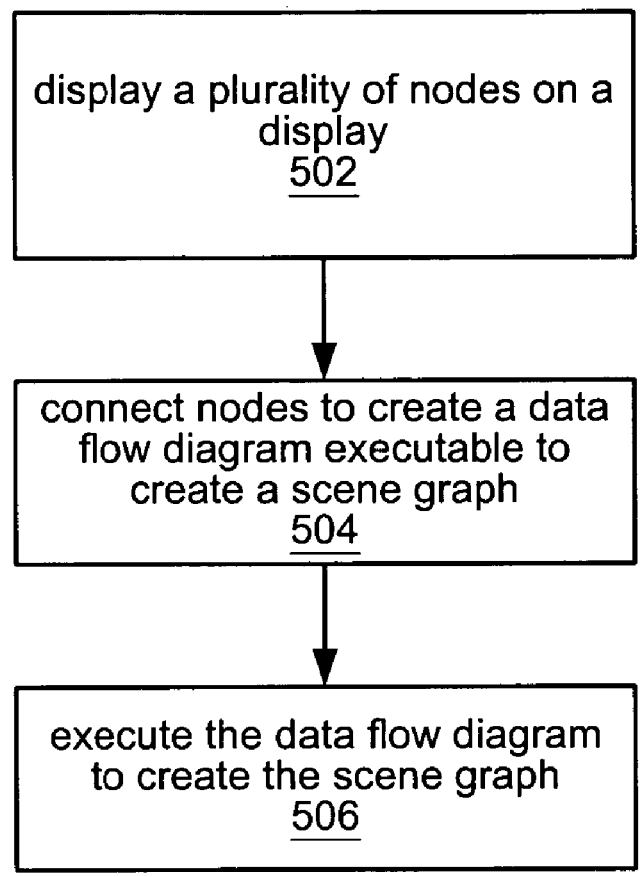
FIG. 5 is a flowchart diagram illustrating one embodiment of a method for creating a scene graph for a 3D scene.

FIG. 5 illustrates a method for creating a scene graph for a 3D scene, and optionally, for rendering the scene based on the generated scene graph. Note that as used herein, the term "scene graph" refers to information (e.g., a data structure) that specifies a plurality of objects and their relationships with one another, where the scene graph is usable in rendering a graphical image of the scene. In a preferred embodiment, the scene is a three dimensional scene, e.g., a scene with one or more 3D objects in a 3D spatial configuration, although it should be noted that scenes and objects of other dimensionality are also contemplated. The method shown in FIG. 5 may be used in conjunction with any of the computer systems or devices shown in the above Figures, among other devices. It should be noted that in various embodiments, some of the steps described may be performed concurrently, in a different order than shown, or omitted. Additional steps may also be performed as desired. As shown, this method may operate as follows.

In 502, a first plurality of nodes may be displayed on a display (e.g., in a GUI on a computer monitor), where each of the plurality of nodes is executable to create at least a portion of a scene graph. For example, the first plurality of nodes may be displayed in a block diagram window, as used in the LabVIEW graphical development environment.

Then, in 504, the first plurality of nodes may be connected to create the data flow diagram, where the first plurality of nodes are connected to specify data flow among the plurality of nodes.

Thus, steps 502 and 504 include creating a data flow diagram in response to input, where the input may be user input, or programmatic input from a program or from an external system coupled to the host computer 82.

Thus, the data flow diagram, which in some embodiments may also be referred to as a graphical program, may be created or assembled by the user arranging on the display the plurality of nodes or icons and then interconnecting the nodes to create the data flow diagram. For example, in one embodiment, a second plurality of nodes may be displayed on the display, where each of the second plurality of nodes is selectable for inclusion in a data flow diagram, and user input received selecting the first plurality of nodes from the second plurality of nodes. In a preferred embodiment, the second plurality of nodes may be displayed in one or more palettes. In response to the user assembling the data flow diagram, data structures may be created and stored which represent the data flow diagram. The data flow diagram may thus comprise a plurality of interconnected nodes or icons which visually indicates the functionality of the diagram or graphical program.

As noted above, in embodiments where the data flow diagram comprises a graphical program, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the data flow diagram or graphical program may be created by the user creating or specifying a prototype, followed by automatic or programmatic creation of the data flow diagram or graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein.

In 506, the data flow diagram (or graphical program) may be executed to create the scene graph, where, as noted above, the scene graph specifies a plurality of objects and relationships between the objects, and is usable in rendering a graphical image of the plurality of objects. In other words, in executing the data flow diagram, the plurality of nodes (selected by the input above) may execute to programmatically generate the scene graph.

In one embodiment, the method may also include storing the scene graph after said executing. In other words, once the scene graph has been generated in 506, the generated scene graph may be stored in a memory medium, for example, a memory medium of the host computer 82 or an external system coupled to the host computer. Said another way, the generated scene graph may be comprised in a data structure, e.g., a file or other data structure, and stored for later use.

As noted above, in some embodiments the data flow diagram comprises a graphical program, including a block diagram portion and a user interface portion. In one embodiment, during execution of the graphical program, the graphical user interface may be displayed on a display of a first computer system and the block diagram may execute on a second computer system.

In one embodiment, displaying the plurality of nodes may further include displaying at least one render node (or functional equivalent) that is operable to receive the scene graph as an input and render an image based on the scene graph. Thus, the data flow diagram (or graphical program) may include the (at least one) render node where the render node is connected (e.g., via a wire in the data flow diagram) to those nodes of the plurality of nodes that execute to generate the scene graph. The execution of the data flow diagram may thus include executing those nodes to generate the scene graph, and providing the generated scene graph as input to the render node, which may execute to render (i.e., draw) the specified scene based on or in accordance with the scene graph. An example of scene graph creation and a rendered scene are described below with reference to FIGS. 8A-8D.

In one embodiment, the data flow diagram (which is executable to create the scene graph) may be created, but may not be executed. For example, the data flow diagram may be created and stored for later execution or use, e.g., for transmission to another user as an example, as a prototype for another user to build on, etc. Thus, in one embodiment, the method may include displaying a plurality of nodes on a display, where each of the plurality of nodes is selectable for inclusion in a data flow diagram, receiving first input selecting at least a subset of the plurality of nodes for inclusion in the data flow diagram, and receiving second input connecting the plurality of nodes to create the data flow diagram, where the data flow diagram comprises the at least a subset of the plurality of nodes, and where the at least a subset of the plurality of nodes are executable to create at least a portion of the scene graph, where, as mentioned above, the scene graph preferably specifies a plurality of objects and relationships between the objects, and is usable in rendering a graphical image of the plurality of objects.

3D Scene Graph Creation and Rendering

FIGS. 6A-6E illustrate embodiments of various components, e.g., nodes and block diagrams, for performing the method described above with reference to FIG. 5. It should be noted that the components described are intended to be exemplary only, and are not intended to limit the invention to any particular set of components or functionality.

As mentioned above, in a preferred embodiment, the scene for which the scene graph is generated is a 3D scene, including a plurality of 3D objects in a specified spatial arrangement. In a preferred embodiment, the scene graph includes an object hierarchy, where the object hierarchy specifies relationships between objects in the scene. The object hierarchy preferably includes nodes corresponding respectively to the objects in the scene, and so each node in the object hierarchy may contain information related to the corresponding object, such as, for example, a name, a parent (which is another object/node), one or more children (e.g., child objects or nodes) and/or a transformation, where, as is well known in the art, the transformation may specify a translation, rotation, and/or scaling, that transforms the object's geometry from local coordinates to world coordinates. The scene graph also preferably includes a plurality of models and/or a plurality of skins, e.g., in the form of a model list and/or a skin list, which in one embodiment, may be included in the object hierarchy. For example, in one embodiment, each node in the object hierarchy may optionally contain a model and a skin, where a model is the geometric information necessary to draw a 3D geometry (the 3D object), and a skin is the surface description for a model such as the model's color, shininess, texture map, etc.

FIGS. 6A-6D—Scene Graph Creation Nodes

Figure 8A:
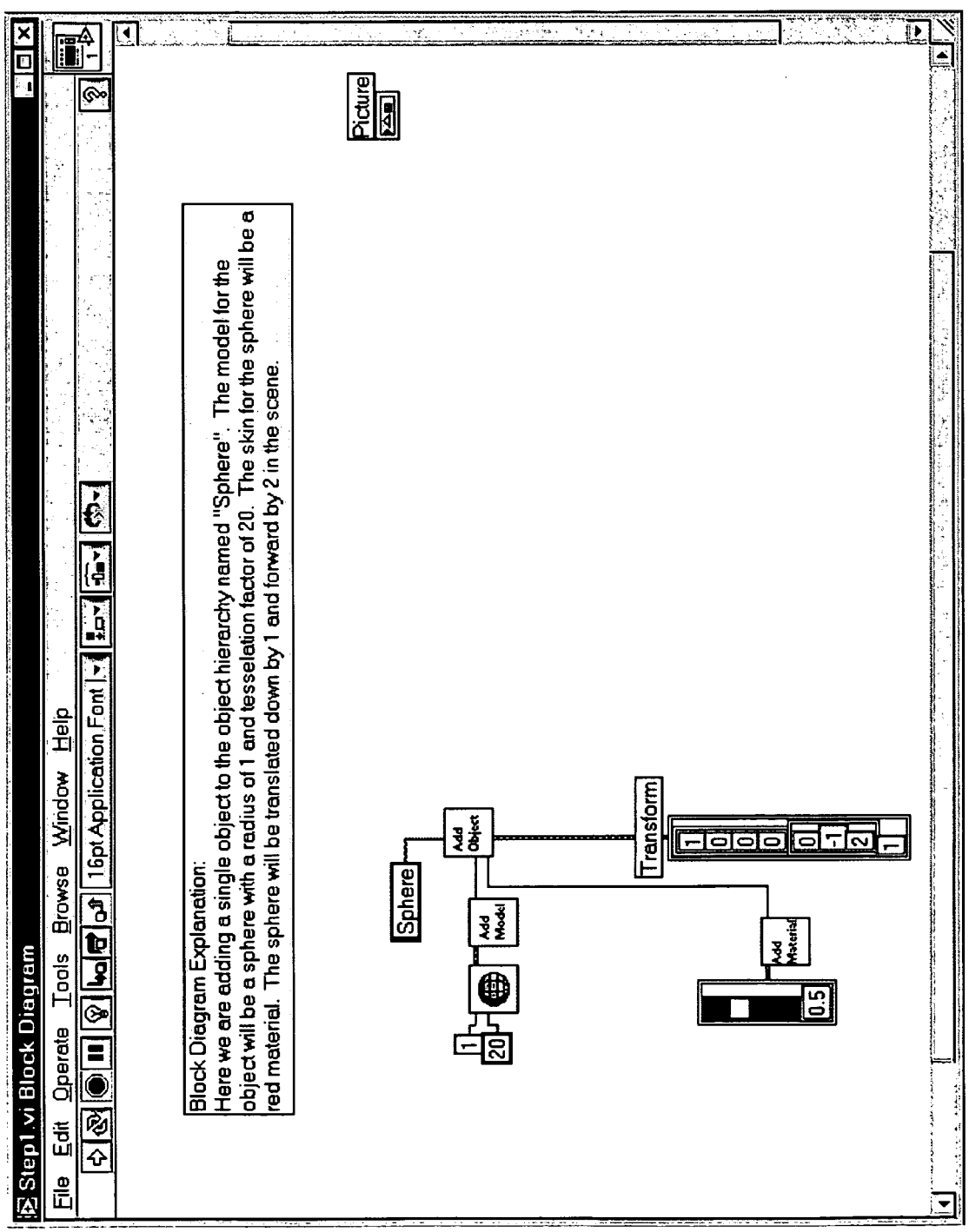
FIGS. 8A-8D illustrate development of a simple example application, according to one embodiment of the present invention.
Figure 8B:
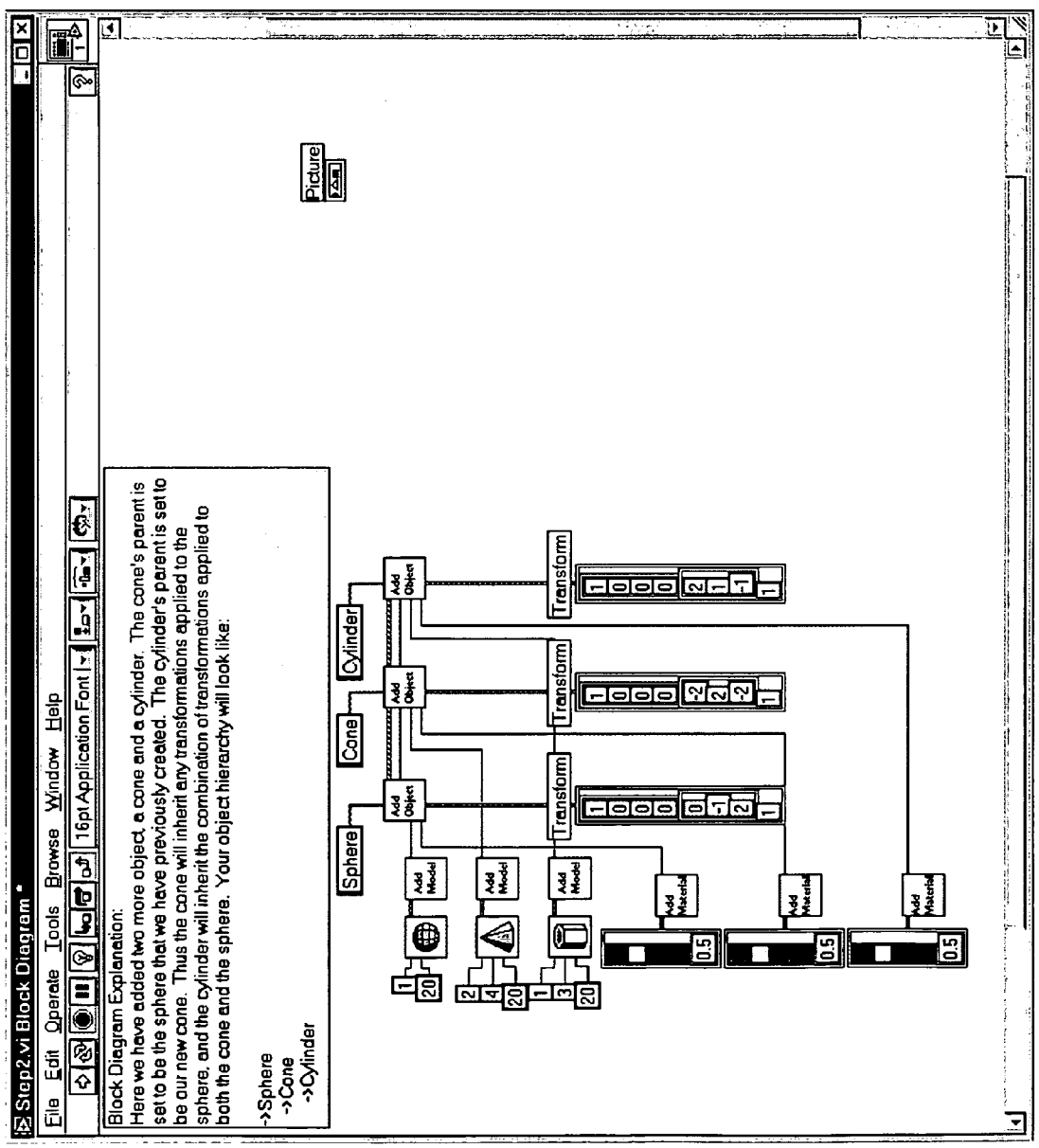
Figure 8C:
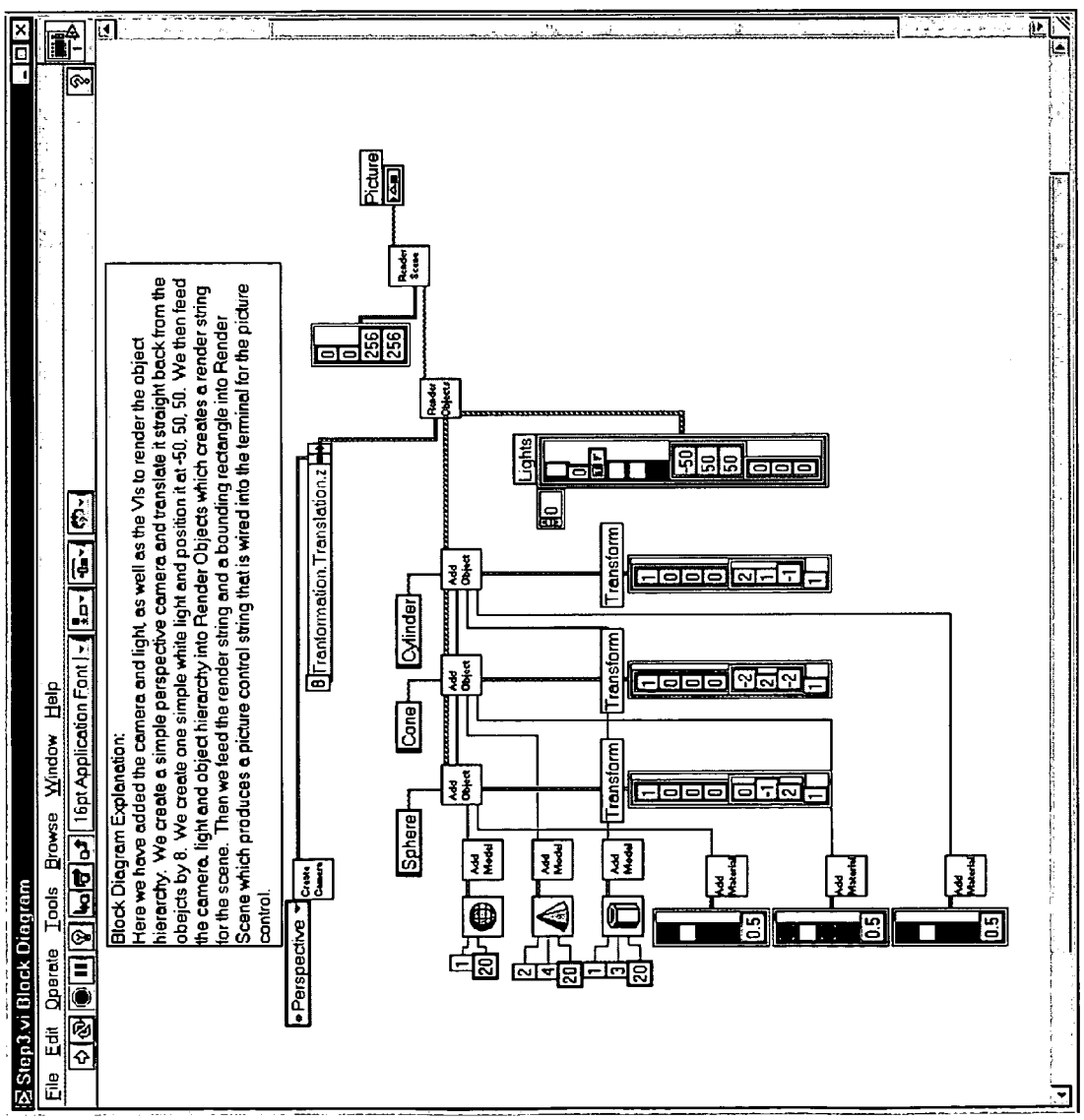

FIGS. 6A-6D illustrate embodiments of various nodes which may be included in the data flow diagram and executed to create the scene graph. FIG. 6E illustrates one embodiment of a palette of nodes for specifying camera points of view (POV) for rendering the scene. Of course, these nodes are meant to be exemplary only, and are not intended to limit the appearance or functionality of the nodes or palettes. FIGS. 8A-8C, described below illustrate a simple example application that utilizes the nodes described below to render a scene.

Figure 6A:
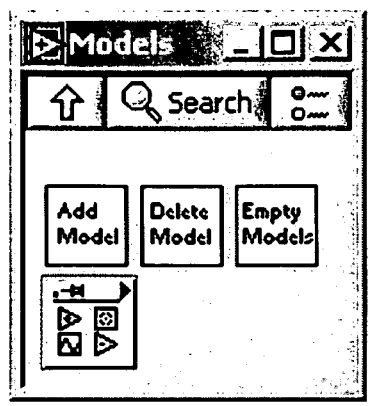
FIGS. 6A-6E illustrate various nodes implementing portions of the present invention, according to one embodiment.

As FIG. 6A shows, in one embodiment, a palette of model nodes may be provided for managing object models in the scene. For example, in the embodiment shown, an add model node may be provided to add a new model (corresponding to an object type) for use in the scene, a delete model node may be provided to remove a model from use in the scene, and an empty models node may be provided for removing all models from use in the scene. It should be noted that in other embodiments, the nodes may be selected from a menu or other user interface element rather than a palette. For example, the user may invoke a menu of node function options, whereby the user may select nodes based on names or descriptions of their functionalities as opposed to the node icons presented in the palette.

In one embodiment, the add model node may add a model to a global model list, returning a reference to the model. This reference may then be used in or by an object to display the model. Note that the model may be included in multiple objects, allowing sharing of duplicate model data. For example, if a scene includes three teapots, one teapot model may be defined and then used in three different objects which all draw the same model. Similarly, in one embodiment, the delete model node may delete a model from the global model list, and the empty models node may delete all models from the global model list.

Figure 6B:
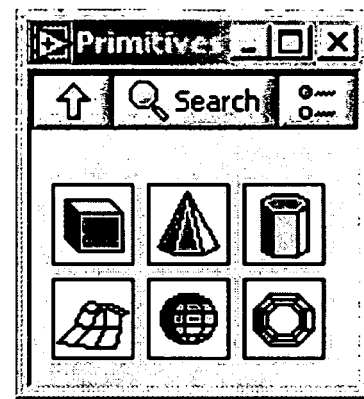

FIG. 6B illustrates one embodiment of a palette of primitive nodes that may be used to generate various model data that can be used with the add model node from above, i.e., a plurality of primitive model building nodes. It is noted that this functionality is not necessarily required for the present invention to operate, but may be used to provide the models with geometric object data. For example, the palette shown includes a build box node which may operate to create a box, a build cone node which may operate to create a cone, a build cylinder node which may operate to create a cylinder, a build sphere node which may operate to create a sphere, and a build toroid node which may operate to create a torus. Additionally, in the example palette shown, a build height map node is also provided that may operate to create a height map, interpreting a two dimensional array of numbers as an evenly distributed field of heights which may be useful for representing arbitrary surfaces such as terrain and so forth. Of course, any other types of geometric primitives may be used as desired, those described above being exemplary only. It should be noted that geometric primitives may be combined to form more complex geometric forms, as is well known in the art. In one embodiment, the relationships specified among the geometric primitives included in a complex form may include various joining means or techniques, such as, for example, splines, surface interpolations, linking constraints, and so forth.

In one embodiment, models may be dynamic. In other words, depending upon various inputs to a model node, the geometric data for the model may be modified dynamically, thereby changing the geometry of the corresponding object.

Figure 6C:

FIG. 6C illustrates one embodiment of a palette of nodes for managing skins for the models mentioned above. As is well known to those skilled in the art, a skin, e.g., a color, texture map, or other surface property, may be assigned to or associated with a model to provide or implement a specified appearance of the corresponding object. For example, as FIG. 6C shows, an add color node may be provided that operates to create a skin with just a simple color that is unaffected by lighting. An add color array node may be provided that operates to create an array of colors for a model, where, for example, each color in the array may map to a respective single vertex in the model. An add material node may be provided that operates to create a skin that contains diffuse, specular, ambient, and/or emissive color components, where these colors may preferably be affected by the lights in the scene. In one embodiment, this node may also specify a shininess of the object's skin. A delete skin node and an empty skins node may be provided that operates to remove a skin from a global skin list (or its equivalent) and to remove all skins from the global skin list, respectively. Additional skin nodes, such as, for example, an add texture node (not shown), are also contemplated.

Similar to the models discuss above, in one embodiment, skins may be dynamic. In other words, depending upon various inputs to a node, the skin data for the model may be modified dynamically, thereby changing the surface appearance of the corresponding object.

Figure 6D:
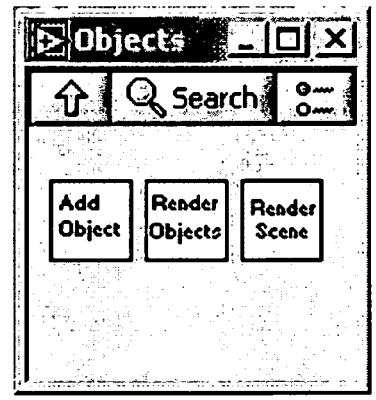
Figure 6E:
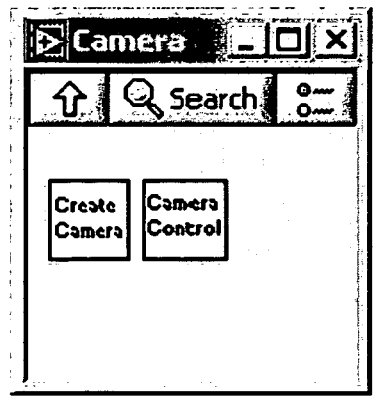

FIG. 6D illustrates one embodiment of a palette of nodes for managing objects that use or include the properties described above, e.g., models, skins, etc. As noted above, the objects are those entities that populate the scene. In the example palette of FIG. 6D, an add object node is provided that may operate to add an object to the scene, i.e., by adding an object to a hierarchy of objects. For example, the user may provide as input the hierarchy to which the object is to be added. In one embodiment, if the object is not coupled to other nodes, a new hierarchy may be created. The user may also provide the new object's name, an ID for the new object's parent, where in one embodiment, if the node is uncoupled to other nodes it may be at the root level of the scene, an ID for model and skin for the object, where in one embodiment, if the node is uncoupled to other nodes it may not display (in one embodiment, an un-displayed object may be used as an extra transformation), and a transformation for positioning and orienting (and optionally, scaling) the object. The add object node may return the newly modified (or created) object hierarchy and the ID of the new object that was created. Other object related nodes (not shown), such as a delete object node, empty object nodes, etc., are also contemplated.

Thus, the data flow diagram (or graphical program) preferably includes a variety of nodes that execute to create the scene graph.

Rendering Nodes

In one embodiment, one or more render nodes may be provided for rendering the scene based on the scene graph. For example, in a preferred embodiment, two additional nodes, a render objects node and a render scene node, may also be provided, e.g., in an object nodes palette. These two nodes are not specifically related to the creation of the scene graph, but rather to the rendering of the scene based on the scene graph, described in more detail below.

FIG. 6E illustrates one embodiment of a palette of nodes for camera management. Similar to the render nodes mentioned above, these camera-related nodes are typically related to the rendering of the scene, and not the creation of the scene graph. For example, as FIG. 6E shows, a create camera node may be provided that operates to create a camera for a scene, allowing the user to specify view attributes such as, for example, the type of projection (perspective or orthographic), the field of view (FOV), the near and far clipping planes, and aspect ratio for the image. The specified camera may then be provided as input to one or more render nodes, e.g., the render objects node, for rendering the scene. A create control node may be provided that operates to create a camera controller for a picture control (GUI element for displaying a picture). A camera controller may be used to make the picture control respond to events, e.g., mouse and/or keyboard events, for adjusting the camera position, for example, allowing the user to drag a cursor or equivalent around in the picture control to move or rotate the view on the scene.

Note that in one embodiment, the data type for the picture control is a string, comprising various drawing commands that the picture control knows how to interpret into a picture (also known as a DSIM). Each of these commands preferably includes an opcode (e.g., kMIOpDLine or kMIOpDFrameRect) and some data (such as an endpoint or a rectangle) that the opcode needs to draw.

Thus, in addition to nodes for generating or creating the scene graph for a scene, nodes may also be provided for rendering the scene in accordance with the scene graph. For example, in one embodiment, the render objects node receives as input a hierarchy of objects, a list of lights, and a camera, and converts them into a render string data format containing the scene hierarchy (objects, models, skins, lights, camera, transforms, etc.), e.g., in a compact set of rendering instructions. In one embodiment, the render scene node may receive the render string data from the render objects node along with a bounding rectangle and combine the data with a standard 2D picture data type, and provide the combined data (e.g., in the form of a string) to a picture control terminal for rendering, where the picture control terminal communicatively couples the block diagram to a corresponding front panel that may operate to display the rendered scene, and may also include controls for manipulating the scene or otherwise providing user input.

Thus, the data output from the rendering nodes in a block diagram may be provided to a terminal corresponding to a picture control on the front panel. A code routine associated with the respective picture control may then be used to display the picture on the screen. The code routine may parse the combined data string and interpret op-codes one at a time from the start of the string until the size indicates that there are no more op-codes. Each picture command may result in a drawing function being called that draws a graphics primitive to the screen, or to an off-screen buffer that may be drawn to the screen or printer. For further information regarding 2D picture creation and control, please see U.S. Pat. No. 5,504, 917 titled "Method and Apparatus for Providing Picture Generation and Control Features in a Graphical Data Flow Environment", which was incorporated by reference above.

Example Graphical Program Code

FIGS. 7A-7D illustrate example graphical program code (in these examples, LabVIEW block diagrams or graphical programs) implementing and/or using some of the nodes described above, according to one embodiment.

Figure 7A:
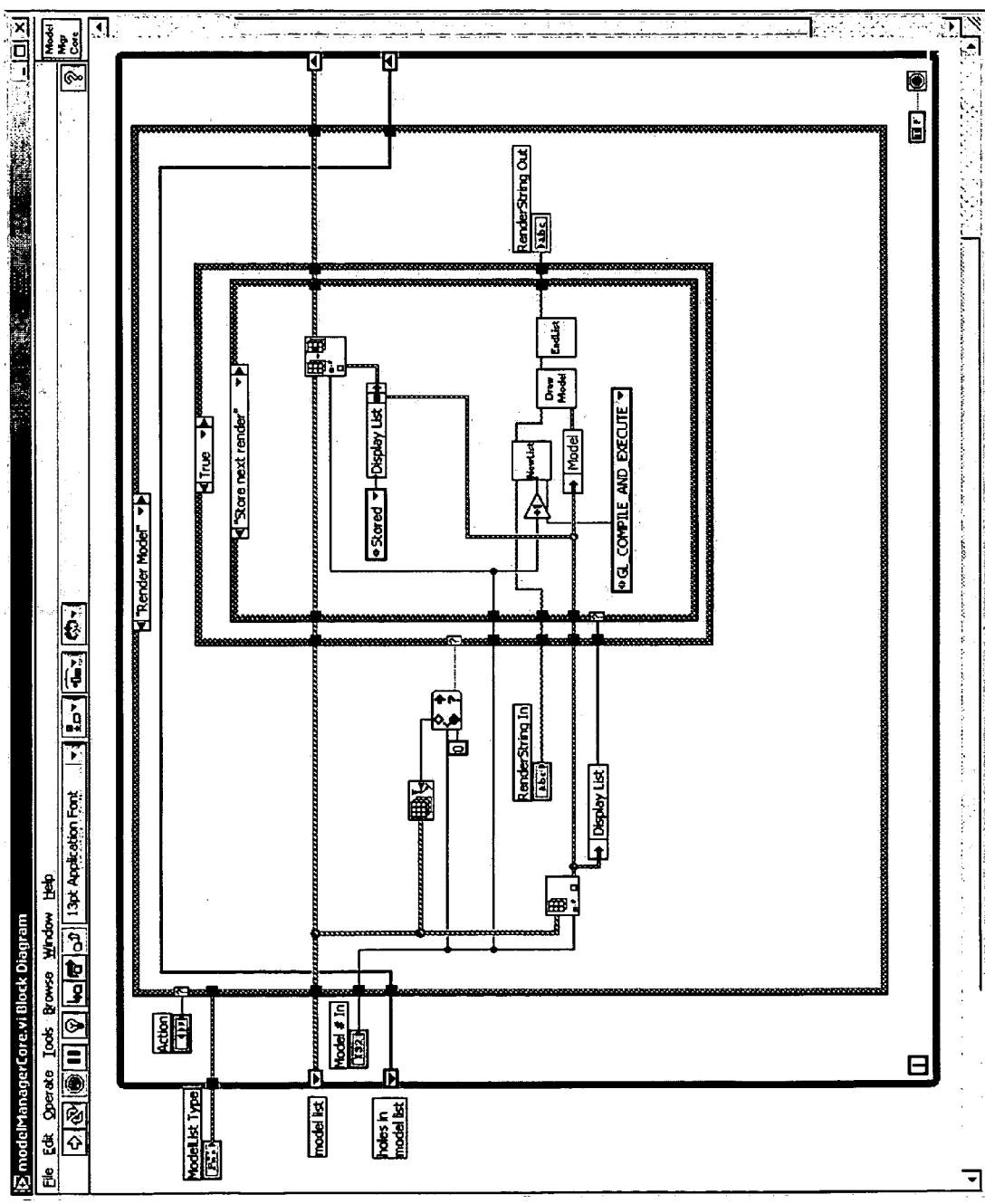
FIGS. 7A-7D illustrate example graphical program code implementing and/or using some of the nodes of FIGS. 6A-6D, according to one embodiment.

FIG. 7A illustrates graphical program code implementing the top level of a model manager that operates to render models, according to one embodiment. As FIG. 7A shows, in this block diagram, a list of models is processed and a corresponding render string generated as output. Note that in this embodiment, information for each model that corresponds to an object in the scene is appended to the render string being created. The program also includes code that caches information to speed up future rendering.

Figure 7B:
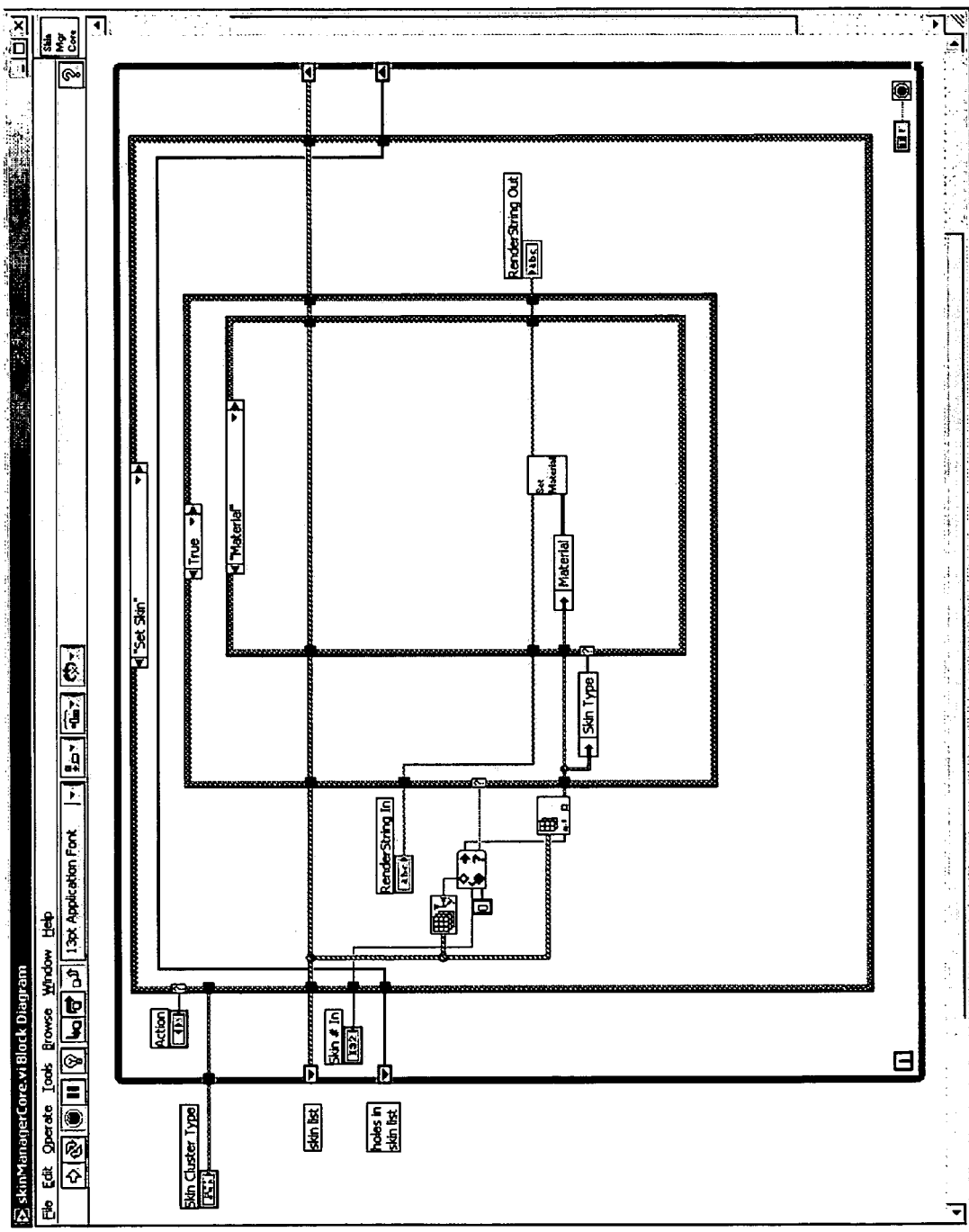

FIG. 7B illustrates graphical program code implementing the top level of a skin manager that operates to incorporate specified skins for objects into the render string, i.e., implementing a "set skin" functionality, according to one embodiment. As FIG. 7B shows, the program processes a list of skins, appending skin data (e.g., material) for each model to the render string being created.

Thus, the model list is just a list of models that the user wishes to draw in the scene, and may include all the model information such as vertices, faces (polygons) and normals. The user may refer to an object in this list from within the scene by using an ID number for that object. The skin list is similar to the model list, but contains all of the surface properties a user may apply to a model in the scene.

Figure 7C:
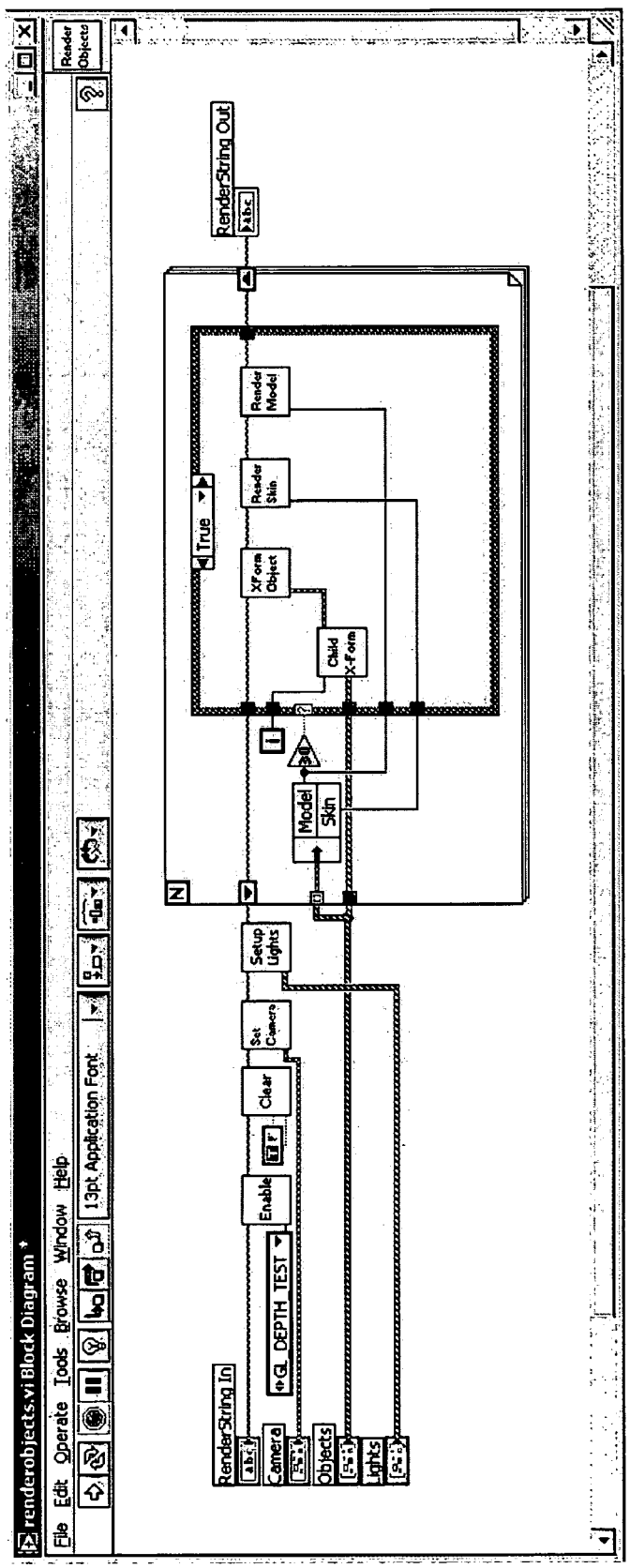

FIG. 7C illustrates graphical program code implementing the top level of functionality for the render objects node, according to one embodiment. The graphical program code of FIG. 7C preferably operates to incorporate all of the object data, as well as lighting and camera data, into the render string representation. The program preferably appends commands together to create the scene. For example, as FIG. 7C shows, the program receives a render string, a camera, and objects as input, appending camera and light information to the render string, and iteratively processing every object in the scene, calculating each object's transformation based on its parents, then adding the skin and model for the object to the string, and outputting the generated render string.

Figure 7D:
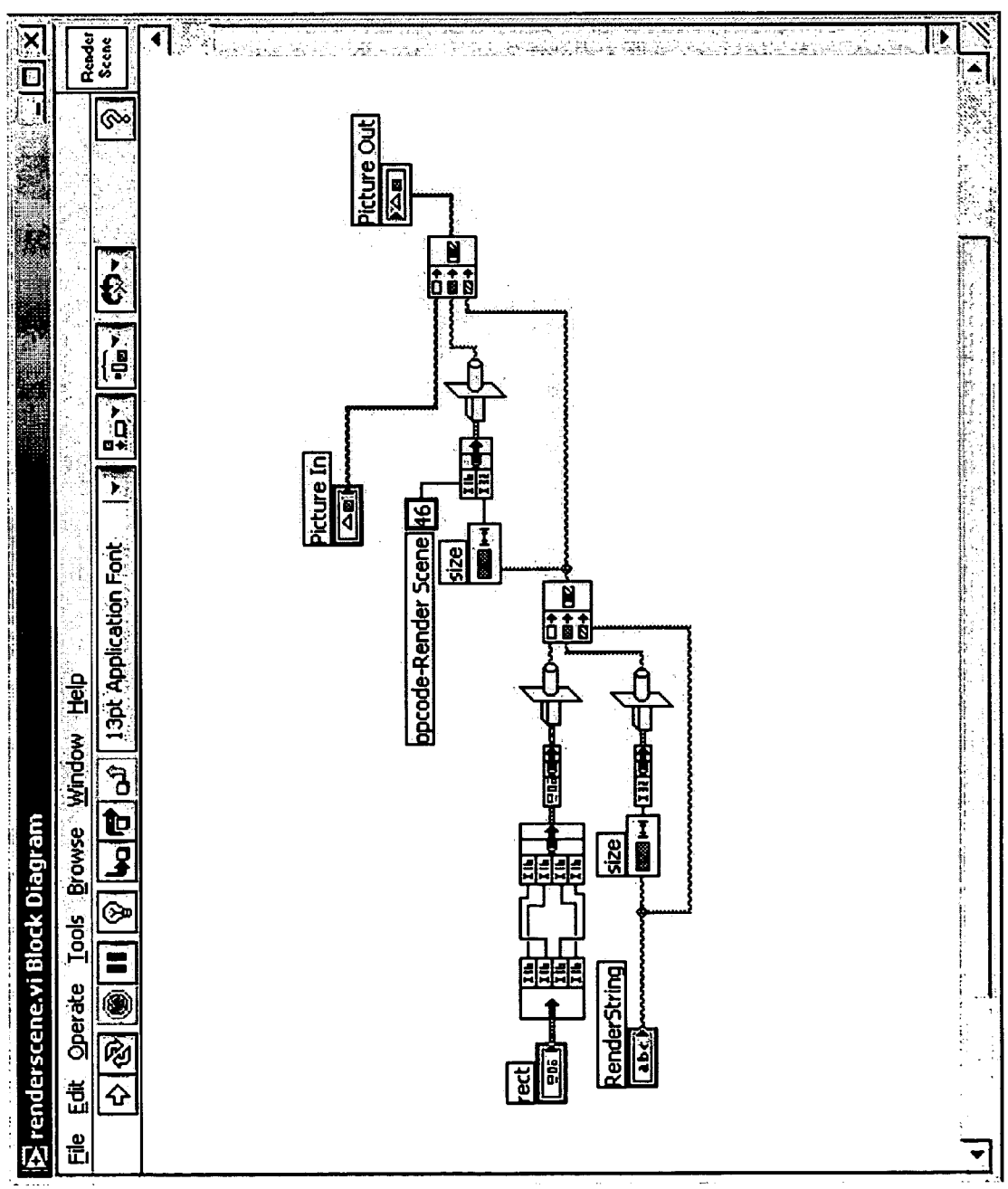

FIG. 7D illustrates graphical program code implementing the top level functionality of the render scene node, according to one embodiment. As FIG. 7D shows, the program receives the render string representing the scene, and converts the render string to a picture control data type (e.g., a picture control string), e.g., via bit manipulation. The program may then provide the picture control data to a picture control (e.g., in a front panel) via a picture control terminal.

Thus, in one embodiment, once the scene graph (e.g., the object hierarchy and model data) have been generated, the object hierarchy may be wired into the render object node mentioned above along with camera and lighting information to convert all of these elements into a render string (a script or series of draw commands (e.g., 3D draw commands) encoded as a string). The render string may then be passed into the render scene node along with a bounding rectangle to draw or append the 3D scene to an existing 2D picture. Note that the render scene node is preferably wired to a picture control terminal for displaying the image on a front panel.

It should be noted that in some embodiments, user access to data involved in generating and rendering the scene may be restricted. For example, in one embodiment, data that are actually included in the block diagram, i.e., that are "in a wire", may be viewed and/or manipulated by the user, while other data, which may be represented in the block diagram by a reference to the actual data, may not be accessible to the user, i.e., may be "opaque" to the user. As a more specific example, in one embodiment, the object hierarchy may be kept on the user's diagram in a wire and passed through various "add nodes" graphical program code to compose the corresponding scene. Thus, the object hierarchy may be viewed and/or manipulated by the user, e.g., to change the configuration of the objects, but since the object hierarchy only maintains references to the objects or models, the models themselves may be included in the block diagram only by reference, and so may not be accessed by the user.

FIGS. 8A-8D—Example Application

Figure 8D:
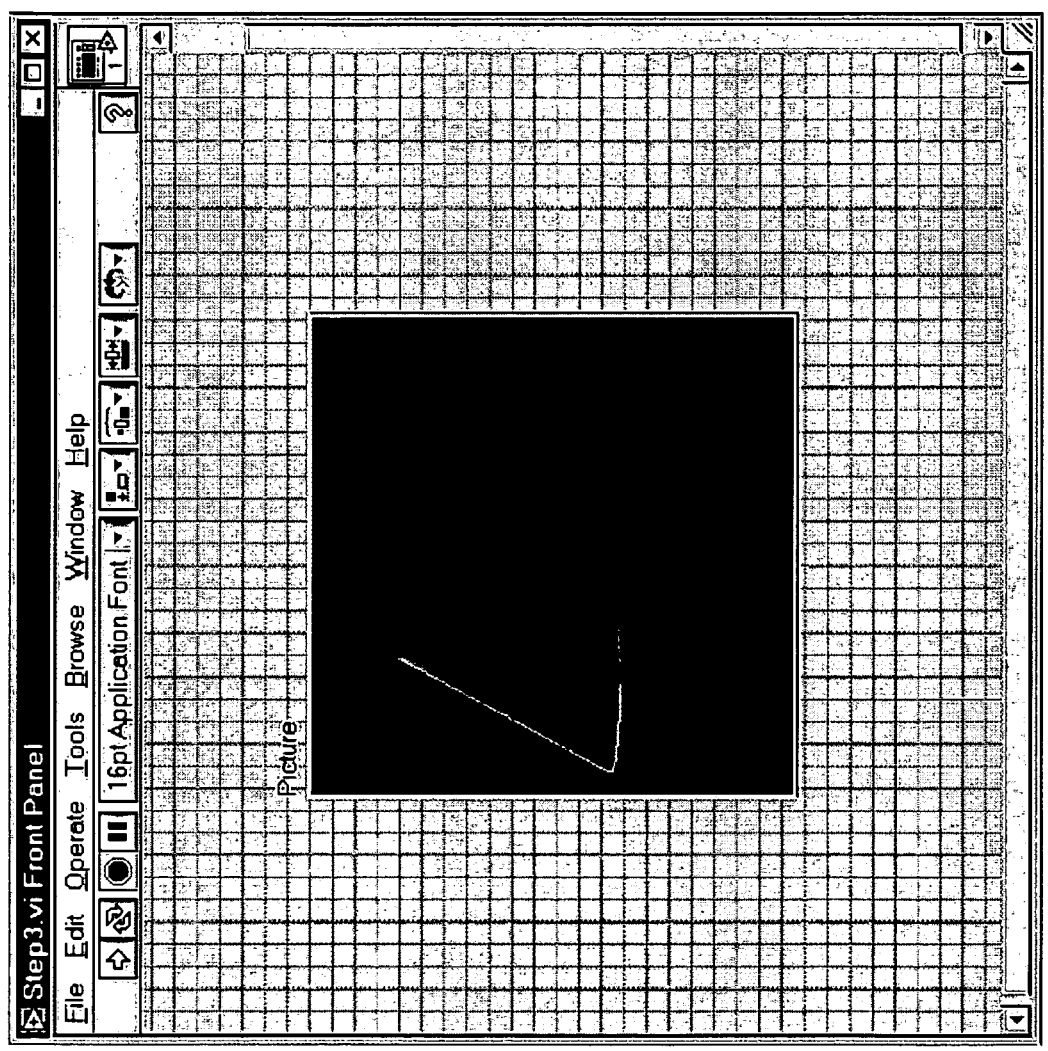

FIGS. 8A-8D illustrate a simple example application illustrating the above concepts, where FIGS. 8A-8C illustrate incremental development of a graphical program for creating and rendering a simple 3D scene, and FIG. 8D illustrates a resulting rendered image.

FIG. 8A illustrates a first portion of the graphical program where a sphere has been added to the scene. As FIG. 8A shows, the geometric primitive (sphere) is provided to the add model node, which generates a model based on or using the sphere primitive (geometric data for a sphere). The generated model, skin information (via the add material node), and a transform (for position, size, and orientation), are then added to the scene via the add object node. As FIG. 8A shows, all of the inputs are provided to the add object node, along with a name ("Sphere") as inputs, and the add object node operates to add the sphere object to an object hierarchy for the scene. In this particular example, the sphere is specified to have a radius of 1, and a tessellation factor of 20 (indicating the number of polygons in the sphere). The skin is specified to be red. The sphere is also specified (by the transform) to be translated downward by 1, and forward by 2 in the scene. Note that a picture control terminal is also included in the block diagram, but is not currently coupled to any of the nodes.

FIG. 8B illustrates the graphical program of 8A, but where additional objects have been added to the scene, i.e., a cone and a cylinder, in the same manner as described above with reference to FIG. 8A. As FIG. 8A shows, the cone's parent is set to be the sphere that was created in FIG. 8A, indicated by the top blue line between the sphere and cone add object nodes. Similarly, the cylinder's parent is set to be the new cone. Thus the cone will preferably inherit any transformations applied to the sphere, and the cylinder will preferably inherit the combination of transformations applied to both the cone and the sphere. The corresponding object hierarchy may thus be represented by:

->Sphere
  ->Cone
    ->Cylinder

FIG. 8C illustrates the graphical program of 8A and 8B, but where a camera and light have been added, as well as nodes for rendering the object hierarchy. As FIG. 8C shows, a simple perspective camera is specified and translated straight back from the objects by 8. A simple white light is also created and positioned at −50, 50, 50. The camera, light and object hierarchy are then provided as input to the render objects node which creates a render string for the scene. The render string and a bounding rectangle are then provided as input to the render scene node, which may produce a picture control string that is wired into the terminal for the picture control, as shown.

FIG. 8D illustrates one embodiment of the picture control displaying the scene created by the graphical programs of FIGS. 8A-8C. In this particular example, the picture control is a LabVIEW picture control contained in a LabVIEW front panel. As FIG. 8D shows, each of the objects that were generated and added to the scene are presented in the rendered image in accordance with the specified camera and lighting. In some embodiments, the front panel may include various controls for manipulating the object hierarchy, e.g., for moving the objects around in the scene, modifying camera angle, and/or modifying lighting for the scene, among others.

In one embodiment, the systems and methods described herein may support such features as undo, redo, diff, mutation, and save for previous, to aid the user in developing the data flow diagram or graphical program, these functions being well known in the art.

Thus, various embodiments of the systems and methods described herein may be used to specify and create a scene graph, e.g., for a 3D scene, using graphical programming techniques.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-accessible memory medium comprising program instructions for creating a scene graph, wherein the program instructions are executable to implement:
    creating a data flow diagram in response to input, wherein said creating comprises:
        displaying a first plurality of nodes on a display, wherein each of the plurality of nodes is executable to create at least a portion of the scene graph;
        connecting the first plurality of nodes to create the data flow diagram, wherein the first plurality of nodes are connected to specify data flow among the plurality of nodes;
    executing the data flow diagram, wherein said executing creates the scene graph; and
    storing the scene graph in a memory medium after said executing;
    wherein the scene graph comprises nodes representing corresponding objects in a scene, wherein the nodes representing the objects are different from the nodes in the data flow diagram, wherein the scene graph specifies a plurality of objects and relationships between the objects, and wherein the scene graph is usable in rendering a graphical image of the plurality of objects.

2. The memory medium of claim 1, wherein the scene graph specifies a three dimensional (3D) scene.

3. The memory medium of claim 2, wherein the three dimensional (3D) scene comprises a plurality of 3D objects in a specified spatial arrangement.

4. The memory medium of claim 3, wherein the scene graph comprises an object hierarchy that specifies relationships among the plurality of 3D objects in the scene.

5. The memory medium of claim 4,
wherein the object hierarchy comprises a plurality of nodes corresponding respectively to the objects in the scene;
wherein each node in the object hierarchy contains information related to the corresponding object, indicating one or more of:
a name;
a parent object or node;
one or more children objects or nodes; and
a transformation.

6. The memory medium of claim 4, wherein the scene graph further comprises a plurality of models, wherein each model comprises geometric information necessary to draw a respective 3D object.

7. The memory medium of claim 6, wherein the scene graph further comprises a plurality of skins, wherein each skin comprises a surface description for a model, including one or more of:
color;
shininess; and
a texture map.

8. The memory medium of claim 7, wherein each node in the object hierarchy comprises a model and a skin for the corresponding object.

9. The memory medium of claim 1, wherein said creating the data flow diagram further comprises:
displaying a second plurality of nodes on a display, wherein each of the second plurality of nodes is selectable for inclusion in a data flow diagram; and
receiving user input selecting the first plurality of nodes from the second plurality of nodes.

10. The memory medium of claim 9, wherein said displaying the second plurality of nodes on a display comprises:
displaying the second plurality of nodes in one or more palettes on the display.

11. The memory medium of claim 9, wherein the second plurality of nodes comprises one or more of:
an add model node, executable to add a model to the scene graph;
a delete model node, executable to remove a model from the scene graph; and
an empty models node, executable to remove all models from the scene graph.

12. The memory medium of claim 9, wherein the second plurality of nodes comprises one or more of:
an add color node, executable to create a skin with a simple color;
an add color array node, executable to create an array of colors for a model;
an add material node, executable to create a skin that contains diffuse, specular, ambient, and/or emissive color components;
an add texture node, executable to create a skin with a specified texture map;
a delete skin node, executable to remove a skin from the scene graph; and
an empty skin node, executable to remove all skins from the scene graph.

13. The memory medium of claim 9, wherein the second plurality of nodes comprises a plurality of primitive model building nodes, each executable to generate model data for a respective model.

14. The memory medium of claim 13, wherein the plurality of primitive model building nodes comprises one or more of:
a build box node, executable to generate geometric data for a box;
a build cone node, executable to generate geometric data for a cone;
a build cylinder node, executable to generate geometric data for a cylinder;
a build sphere node, executable to generate geometric data for a sphere;
a build toroid node, executable to generate geometric data for a toroid; and
a build height map node, executable to interpret a two dimensional array of numbers as a distributed field of heights.

15. The memory medium of claim 13, wherein the plurality of primitive model building nodes are operable to be used conjunctively to generate complex models.

16. The memory medium of claim 9, wherein the second plurality of nodes comprises one or more of:
an add object node, executable to add an object to the scene graph;
a delete object node, executable to remove an object from the scene graph; and
an empty objects node, executable to remove all objects from the scene graph.

17. The memory medium of claim 9, wherein the second plurality of nodes further comprises one or more render nodes, wherein said displaying the plurality of nodes further comprises displaying at least one render node of the one or more render nodes which is operable to receive the scene graph as an input and render an image based on the scene graph.

18. The memory medium of claim 17, wherein said executing the data flow diagram comprises:
executing the at least one render node to render the image based on the scene graph.

19. The memory medium of claim 17, wherein the one or more render nodes comprise one or more of:
a render objects node, for rendering an object hierarchy in the scene;
a render scene node, executable to render the image based on the scene graph;
a create camera node, executable to create a camera for a scene; and
a create control node, executable to create a camera controller for a picture control.

20. The memory medium of claim 1, wherein the data flow diagram comprises a graphical program.

21. The memory medium of claim 20, wherein the graphical program comprises a LabVIEW graphical program.

22. The memory medium of claim 20, wherein the graphical program comprises a block diagram portion and a graphical user interface portion.

23. The memory medium of claim 22,
wherein, during execution of the data flow diagram, the graphical user interface is displayed on a display of a first computer system and the block diagram executes on a second computer system.

24. A computer-implemented method for creating a data flow diagram which is executable to create a scene graph, the method comprising:
displaying a plurality of nodes on a display, wherein each of the plurality of nodes is selectable for inclusion in a data flow diagram;
receiving first input selecting at least a subset of the plurality of nodes for inclusion in the data flow diagram; and
receiving second input connecting the plurality of nodes to create the data flow diagram, wherein the data flow diagram comprises the at least a subset of the plurality of nodes, and wherein the at least a subset of the plurality of nodes are executable by a processor to create and store a scene graph;

wherein the scene graph comprises nodes representing corresponding objects in a scene, wherein the nodes representing the objects are different from the nodes in the data flow diagram, wherein the scene graph specifies a plurality of objects and relationships between the objects, and wherein the scene graph is usable in rendering a graphical image of the plurality of objects.

25. The computer-implemented method of claim 24, further comprising:

executing the data flow diagram to create the scene graph.

26. The computer-implemented method of claim 25, further comprising:

storing the scene graph after said executing.

27. A system for creating a scene graph, comprising:

a processor; and a memory medium coupled to the processor, wherein the memory medium stores program instructions which are executable to:

create a data flow diagram in response to input, wherein in creating the data flow diagram, the program instructions are executable to:

display a plurality of nodes on a display in response to first input, wherein each of the plurality of nodes is executable to create at least a portion of the scene graph; and connect the plurality of nodes to create the data flow diagram in response to second input, wherein the plurality of nodes are connected to specify data flow among the plurality of nodes;

execute the data flow diagram to create the scene graph and store the scene graph;

wherein the scene graph comprises nodes representing corresponding objects in a scene, wherein the nodes representing the objects are different from the nodes in the data flow diagram, wherein the scene graph specifies a plurality of objects and relationships between the objects, and wherein the scene graph is usable in rendering a graphical image of the plurality of objects.

28. A system for creating a scene graph, comprising:

means for creating a data flow diagram in response to input, comprising:

means for displaying a first plurality of nodes on a display in response to first input, wherein each of the plurality of nodes is executable to create at least a portion of the scene graph; and means for connecting the first plurality of nodes to create the data flow diagram in response to second input, wherein the first plurality of nodes are connected to specify data flow among the plurality of nodes;

means for executing the data flow diagram, wherein said executing creates the scene graph; and means for storing the scene graph;

wherein the scene graph comprises nodes representing corresponding objects in a scene, wherein the nodes representing the objects are different from the nodes in the data flow diagram, wherein the scene graph specifies a plurality of objects and relationships between the objects, and wherein the scene graph is usable in rendering a graphical image of the plurality of objects.

* * * * *